United States Patent [19]

Clark

[11] Patent Number: 5,013,489
[45] Date of Patent: May 7, 1991

[54] SLUDGE TREATMENT APPARATUS

[76] Inventor: Kenneth G. Clark, Rectory Lane, Wallington, Surrey, SM6 3DX, United Kingdom

[21] Appl. No.: 431,781

[22] Filed: Nov. 6, 1989

[30] Foreign Application Priority Data

Dec. 15, 1988 [GB] United Kingdom ............... 8829220

[51] Int. Cl.$^5$ .............................................. B01F 3/04
[52] U.S. Cl. .................................... 261/77; 210/220; 210/221.2; 261/123; 366/101; 366/138
[58] Field of Search ....................... 261/77, 123, 69.1; 210/219, 221.2, 220; 366/138, 101

[56] References Cited

U.S. PATENT DOCUMENTS

| 2,604,444 | 7/1952 | Piccardo | 261/77 X |
| 3,606,984 | 9/1971 | Robertson | 210/219 X |
| 3,679,187 | 7/1972 | Smith | 261/123 |
| 3,794,303 | 2/1974 | Hirshon | 261/77 X |
| 3,898,308 | 8/1975 | Baum | 261/69.1 |
| 4,187,263 | 2/1980 | Lipert | 261/123 X |
| 4,569,757 | 2/1986 | Moore | 261/77 X |

FOREIGN PATENT DOCUMENTS

| 0033407 | 3/1984 | European Pat. Off. |
| 1221022 | 2/1971 | United Kingdom . |
| 1400723 | 7/1975 | United Kingdom . |
| 1434200 | 5/1976 | United Kingdom . |
| 1511693 | 5/1978 | United Kingdom . |
| 1556110 | 11/1979 | United Kingdom . |
| 2104402 | 3/1983 | United Kingdom . |
| 2148744 | 6/1986 | United Kingdom . |

*Primary Examiner*—Richard L. Chiesa
*Attorney, Agent, or Firm*—Shapiro and Shapiro

[57] ABSTRACT

A gas bubble generator for mixing or promoting turbulence in a liquid medium, particularly sewage or effluent, comprising a collector for gas which collector is submerged in the medium and has an exit from which leads a pipe with a curved part between the exit and a free end of the pipe from which gas escapes as a bubble to surrounding liquid medium. The free end is spaced laterally from the exit, and curvature of the curved part is such so that there is no obstruction of the pipe by the medium, the curvature forming a circular arc of 135° for example. The exit of the gas collector is preferably aligned with a gas inlet to facilitate cleaning of the pipe in situ (i.e., with the generator submerged) by insertion of a flexible rod-like cleaning tool into the gas supply line, straight through the inlet and the exit, and into the pipe. The collector preferably also includes a device for blocking off an internal portion of the collector to enable purging of the pipe by introducing high pressure fluid into the blocked off collector.

28 Claims, 6 Drawing Sheets

SLUDGE TREATMENT APPARATUS

BACKGROUND OF THE INVENTION

The invention relates to a gas bubble generator for example of the kind used in sludge treatment in a digestion tank or digester, though it will be understood that a gas bubble generator as described herein may be used in other applications.

It is often necessary to create turbulance in a liquid or liquid containing solid matter such as sludge, such liquid or sludge being hereinafter referred to collectively as 'liquid medium'. One way of creating turbulence is to pass a steady stream of bubbles through the liquid medium. Such bubbles as they pass upwardly through the liquid medium promote mixing in the medium and also act to break up or disperse scum on the surface when they reach the surface and burst.

Bubble generators used in digesters are immersed in the liquid medium and systematically create a bubble by forcing a gas out of a tube by a hydrostatic effect as liquid medium passes through the generator forcing a trapped pocket of gas therethrough prior to expulsion as a bubble. As the liquid medium contains solid matter which is often fibrous, known as 'rag', the rag can and usually does become caught in the generator on tight bends thereof. This has the disadvantage of either reducing the efficiency of bubble formation or preventing it altogether, while the construction of the generator makes it virtually impossible to clean by purging or mechanically by rodding. It is accordingly an object of the invention to seek to mitigate these disadvantages.

SUMMARY OF THE INVENTION

According to one aspect of the invention there is provided a gas bubble generator for mixing or promoting turbulence in a liquid medium, comprising a collector for gas and a pipe, leading from an exit from the collector, having an opening from which gas can escape in use as a bubble to surrounding liquid medium, wherein the opening is spaced laterally from the exit from the collector.

Using the invention it is possible to provide a smoothly curved or opened out gas bubble generator which enables purging by gas or liquid for cleaning, or cleaning by 'rodding'.

The opening may be at an end of the pipe remote from the exit of the collector. This provides for a relatively simple construction.

The pipe may include a curved part between the end and the exit which curved part is preferably radiused, forming a circular arc of between 90° and 180°, preferably about 135°. This provides a smooth path which prevents obstruction in the pipe.

The gas collector may be a vessel with a bottom open to surrounding liquid medium, and there may be a device adapted to close off the opening to ingress in use of surrounding medium.

The device may comprise an expansible member adapted to be expanded into the container to obturate the cross-sectional area thereof against ingress of liquid medium.

This expansible member may be a sleeve enclosed by a metal cover and extending over an aperture in a boundary wall of the collector whereby the sleeve expands into the collector to obturate it when fluid under pressure is passed into a space between the sleeve and the cover therefor.

There may be two sleeves each with its own cover and spaced opposite one another in the boundary wall of the collector.

The or each resilient sleeve may comprise a rubber sleeve.

The or each cover may comprise an aluminium cover.

The generator may be in combination with a riser tube into which the opening of the pipe may be directed.

The generator may include an adjustable support structure whereby the collector and pipe are supported.

The adjustable support structure may comprise a plurality of spaced apart support legs connected by support beams, and there may be a captive rotatable screw threaded jack passing through a screw threaded member adjacent a beam whereby to adjust the position of the beam on rotation of the jack.

The legs may each have an angled foot member for mounting the support structure on a sloping floor.

According to a second aspect of the invention there is provided a sludge digester, including a gas bubble generator as hereinbefore described.

There may be a plurality of gas bubble generators in the digester.

There may be means to pass a cleaning medium through the gas bubble generator.

The cleaning medium may be effluent.

The medium may be a flexible rod.

BRIEF DESCRIPTION OF THE DRAWINGS

A gas bubble generator and a sludge digester embodying the invention are hereinafter described, by way of example, with reference to the accompanying drawings in which.

DESCRIPTION OF THE PREFERRED EMBODIMENTS

Referring to the drawings there is shown a gas bubble generator 1 for mixing or promoting turbulence in a liquid medium 2, comprising a collector 3 for gas and a pipe 4 leading from an exit 5 from the collector 3, and having an opening 6 from which gas can escape as a bubble 7 to surrounding liquid medium 2, the opening 6 being spaced laterally from the exit 5 from the collector 3. The opening 6 is, in the embodiment shown, at an end of the pipe 4 remote from the collector 3 and is in use horizontally displaced therefrom as shown. The end 8 of the pipe 4 is vertically, as viewed, higher than the exit 5. The pipe 4 has a curved part 9, between the end 8 and the exit 5, which curved part 9 is, as shown, a radiused lower part of the pipe 4 having the form of a circular arc in the range 90°–180°, in the embodiment shown 135° (FIG. 9).

Figures 5, 6:
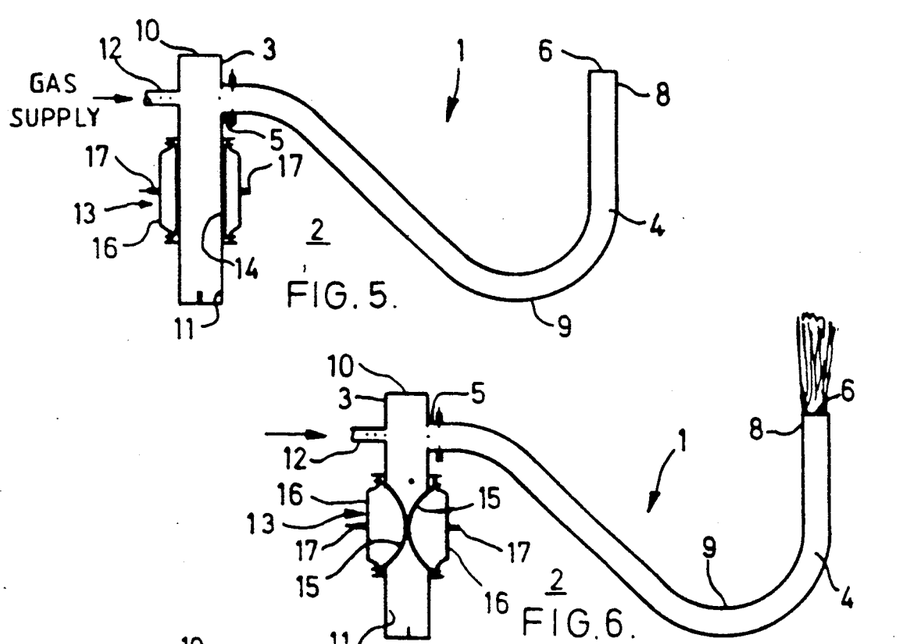
FIGS. 5 to 8 are schematic side elevational views of the gas bubble generator of FIGS. 1 to 4, showing 'in service' cleaning thereof.
Figures 9, 9A:
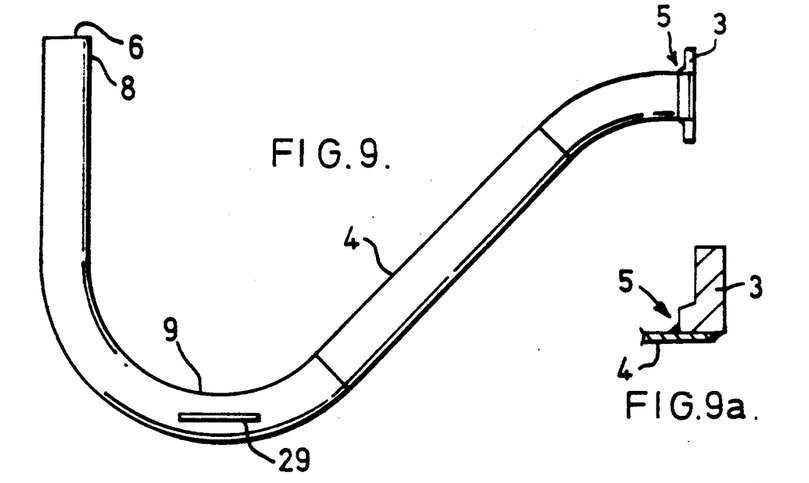
FIG. 9 shows to an enlarged scale a side elevational view of a pipe of the gas bubble generator of FIGS. 1-8.
FIG. 9A shows an enlarged detail of FIG. 9.
Figure 10:
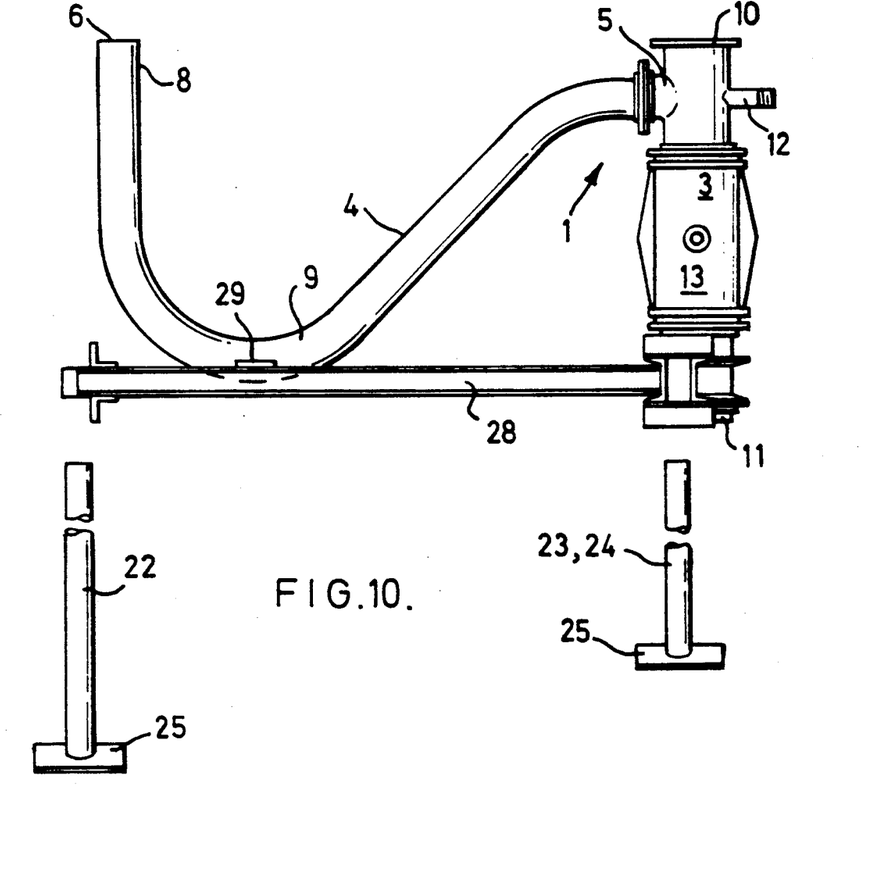
FIGS. 10-12 show respectively side elevational, end elevational and plan views of the gas bubble generator for FIGS. 1 to 9, and a support structure therefor.
Figure 11:
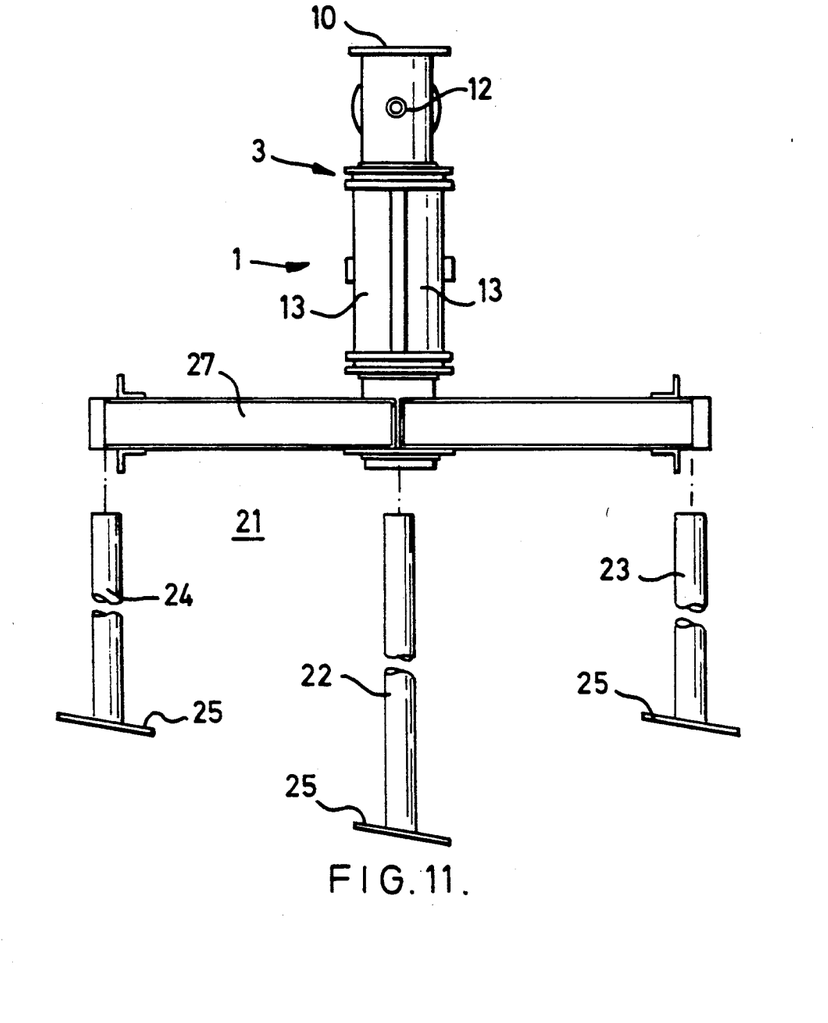

Referring, for example, to FIG. 5, collector 3 is essentially a tube closed at one end (the top 10 in use) and having an open bottom 11, there being a gas inlet 12 opposite the exit 5, which has a chamfered transition from the interior of the collector 3 so as to avoid corners or edges where solids may collect (FIG. 9A).

The collector 3 also has means whereby the interior may be obturated against ingress of surrounding liquid medium 2. The collector 3 has two facing holes or slots 14 in its boundary wall and in these holes or slots 14 there are expansible members in the form of rubber sleeves or diaphragms 15 held in place by metal, for example cast aluminium, covers 16. The covers 16 are secured to flanges of the collector 3 by complementary flanges with the sleeves or diaphragms 15 in between the flanges to be secured in position. The covers 16 form a manifold with the sleeves, and there is a connection 17 whereby a line 18 from a source 19 of gas under pressure, such as a cylinder of nitrogen, is connected with each manifold 15, 16 via a T-piece connector 20 (FIG. 14).

Figures 12, 13:
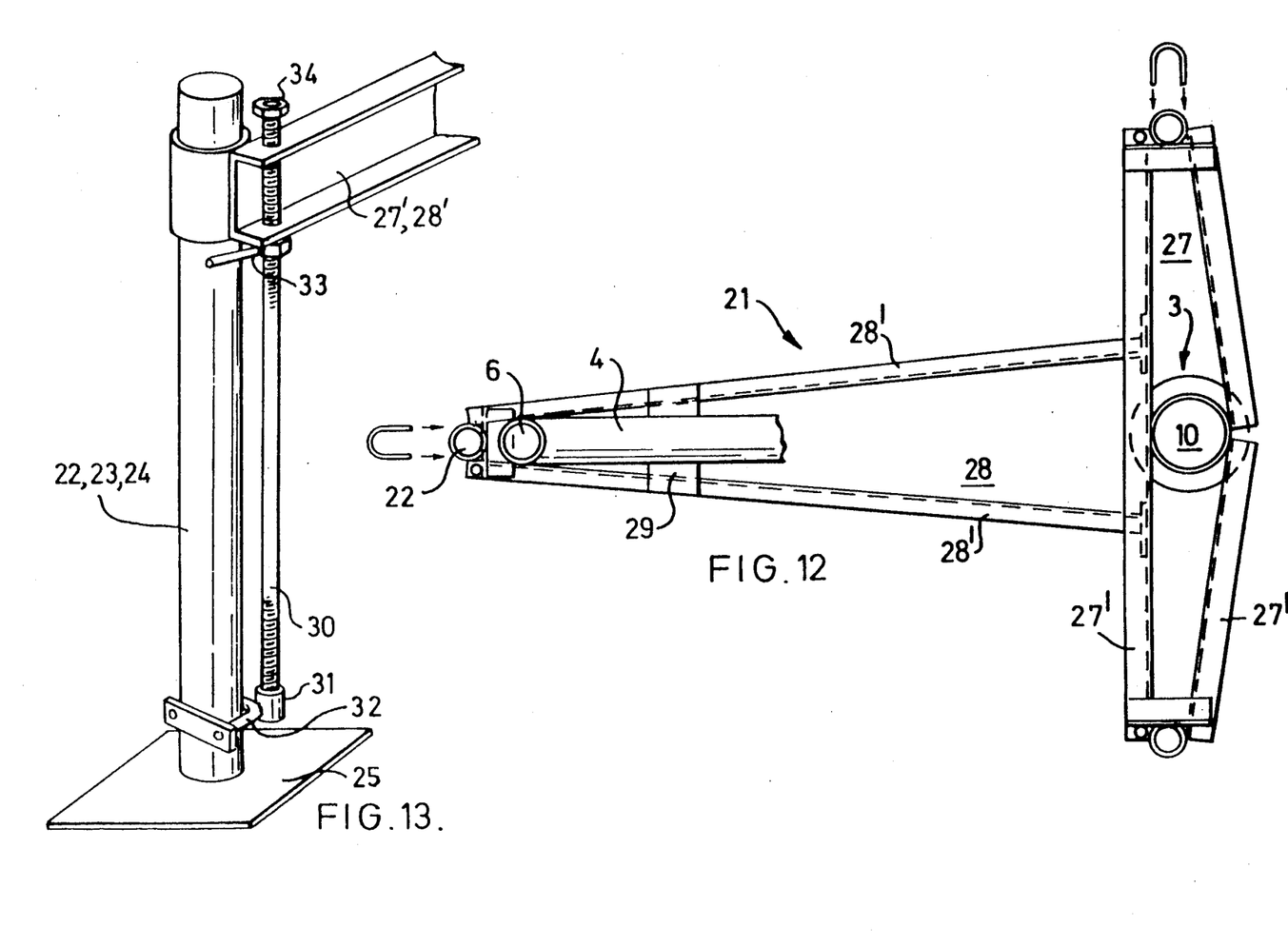
FIG. 13 shows a schematic elevational view of an adjustment means of the support structure of FIGS. 10-12.

The gas bubble generator 1 is supported on a structure 21 comprising three upright support legs 22, 23, 24 each with an angled foot 25 for mounting on a sloping surface such as the angled floor of a sludge digester 26. The three support legs 22, 23 and 24 are arranged in the form of a triangle as considered in plan (FIG. 12) and are rigidly connected together by a main beam 27 and an extension beam 28. The main beam 27 comprises spaced apart girders 27' which are doubly convergent and supports the collector 3, whereas the extension beam 28 comprises two girders 28' which converge towards a leg 22 and which provide a support a plate 29 (FIG. 9) which is shaped and welded to the pipe 4. The support structure 21 is adjusted by an adjusting device at each leg (FIG. 13) comprising an elongate externally threaded stud 30 which is received at one end on a captive cap 31 to locate the stud 30 and which is secured to the respective leg 22, 23 or 24 adjacent its foot 25 by a U-bolt 32. The stud 30 passes through a nut with a torque arm 33 and through a girder 27' or 28' to terminate in a nut 34 secured to it as by welding. In use, the stud 30 is rotatable freely in the cap 31 when a turning tool is applied to the nut 34 and thereby jacks the beams 27, 28 upwards by reaction against the nut and torque arm 33. In this way the correct attitude of the support structure is achieved by appropriate adjustment at each leg 22, 23, 24.

Figure 14:
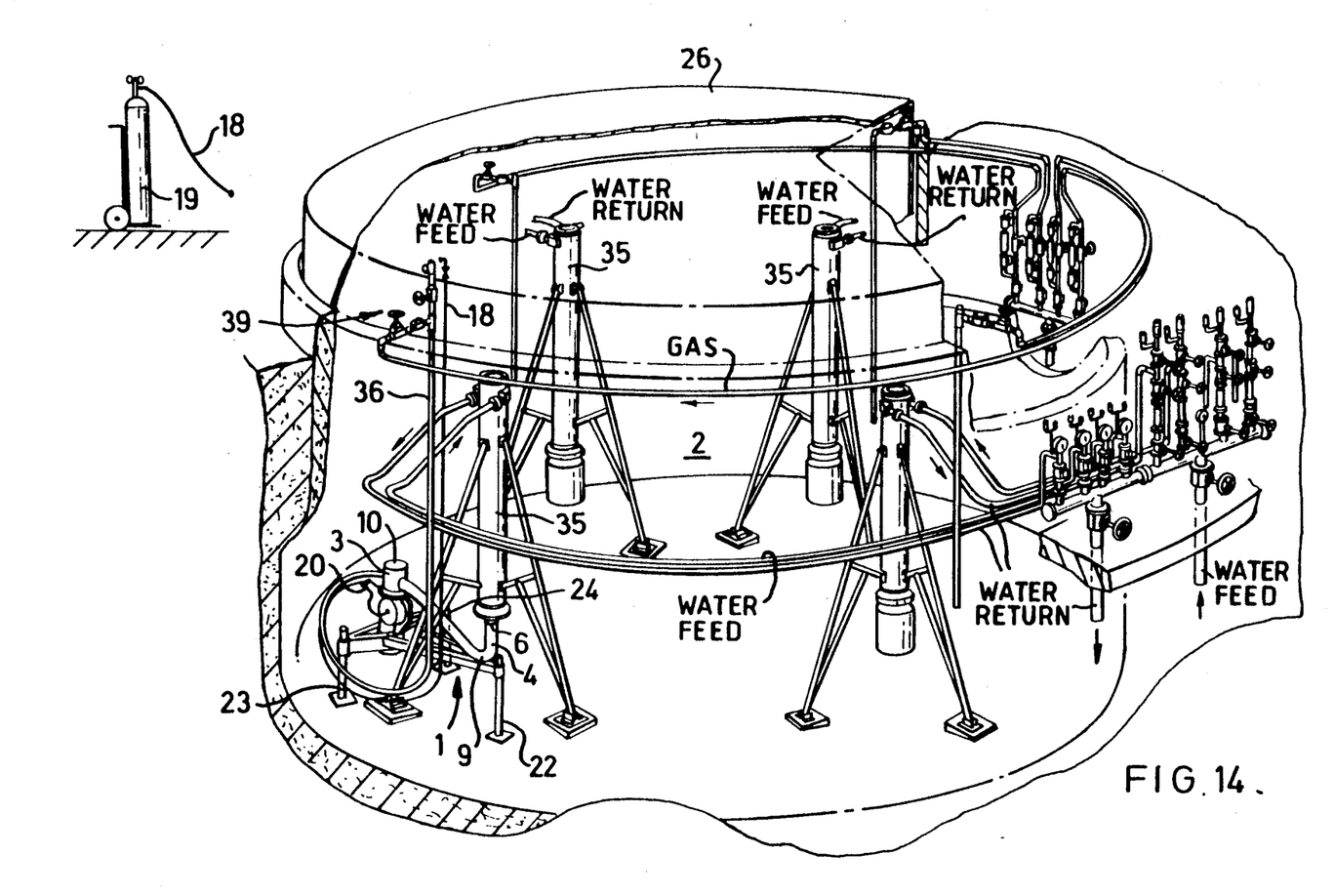
FIG. 14 shows a perspective schematic view of a sludge digester according to the invention.

A bubble 7 generating sequence is shown in FIGS. 1 to 4, assuming the gas bubble generator 1 is completely immersed in sludge 2 in a digester 26 like the one in FIG. 14. In FIG. 14, the pipe opening 6 is directed into the flared lower (as viewed) end of a riser tube 35 out of the top of which the bubble 7 formed by the generator 1 emerges after rising through the tube 35. The bubble then rises through the liquid medium (sludge) effecting turbulence therein. It will be understood that there are four gas bubble generators 1 in combination with respective riser tubes 35 used in FIG. 14, but only one is shown completely for clarity.

Figure 1:
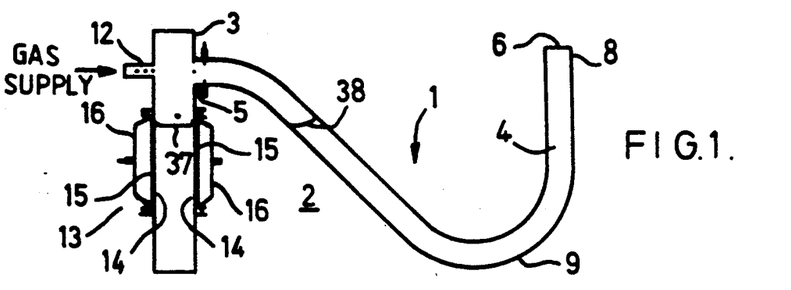
FIGS. 1 to 4 are schematic side elevational views of a gas bubble generator according to the invention in operation to form a bubble.
Figure 2:
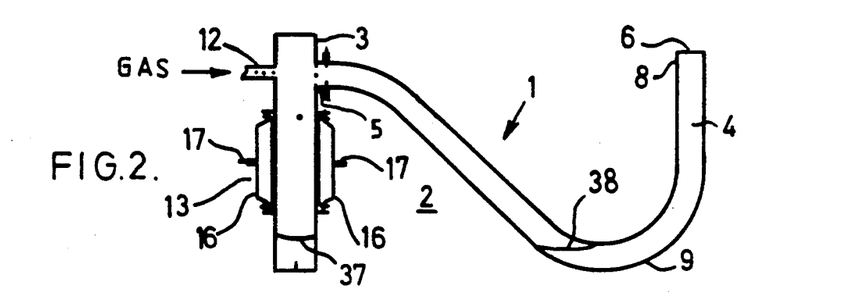
Figures 3, 4:
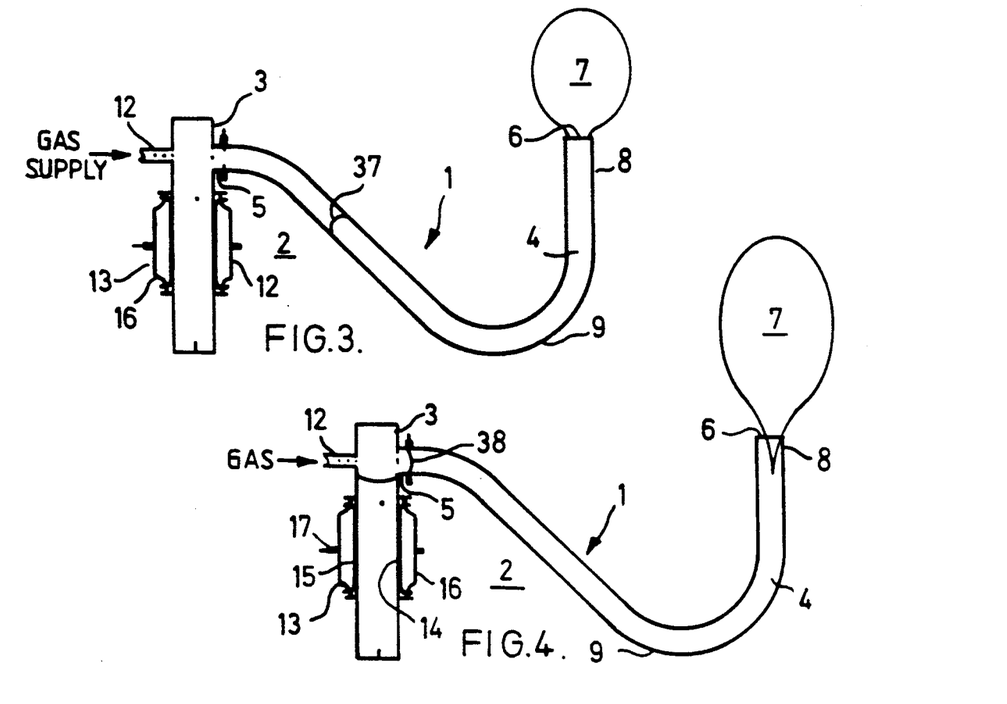

Methane gas from the digester 26 is passed down a conduit 36 to the gas entry 12 to the collector 3, the rubber sleeves being relaxed or unexpanded so that the interior of the collector 3 is completely free, and open for ingress of the surrounding liquid medium 2. The gas displaces the sludge (liquid medium) forming menisci 37, 38 as shown in FIGS. 1–3. Eventually a siphon effect is achieved, and liquid medium below the meniscus 37 has a hydraulic effect forcing the gas pocket trapped between the menisci 37 and 38 out of the collector 3 through the exit 5 and along the pipe 4 (FIG. 2). The siphon effect ensures that the gas continues along the pipe 4 until it exits the opening 6 in the form of a large gas bubble 7 at that opening (FIG. 3).

The bubble 7 then breaks free, rising through the riser tube 35 to the surface of the sludge as a further bubble begins to form as the gas continues to enter (FIG. 4).

Using the gas bubble generator described herein, 6 bubbles of 18" diameter can be formed per minute in a steady and repeatable cycle. This provides for even mixing of the fluid medium 2 and smooth and efficient operation of the digester 26.

Figure 7:
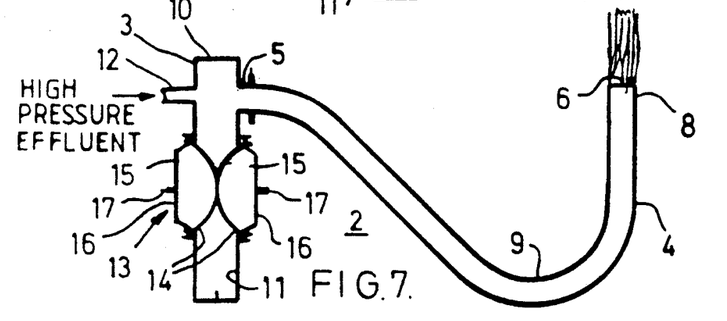

The liquid medium 2 contains solids, often of a fibrous nature, which can catch or snag on corners of the generator such as at the inlet 12 and exit 5, in the curved part 9 of the pipe 4, and at the outlet opening 6. To clean the generator in service or in situ using a gas or effluent purge, without shutting down nitrogen under pressure is passed in to the manifolds from source 19 to expand the sleeves or diaphragms 15 and close off or obturate the interior of the collector 3 against ingress of surrounding liquid medium 2. The methane gas (gas purge) is then forced to flow in a continuous stream through the exit 5 into and through the pipe 4, and this action removes blockages and scours grit from the curved part 9 of the pipe 4 (FIG. 6). Alternatively, (FIG. 7) the methane gas flow can be turned off by operation of suitable valving 39, and effluent (liquid medium) under high pressure is passed through collector 3 and pipe 4, removing blockages and scouring the pipe as in FIG. 6.

Figure 8:
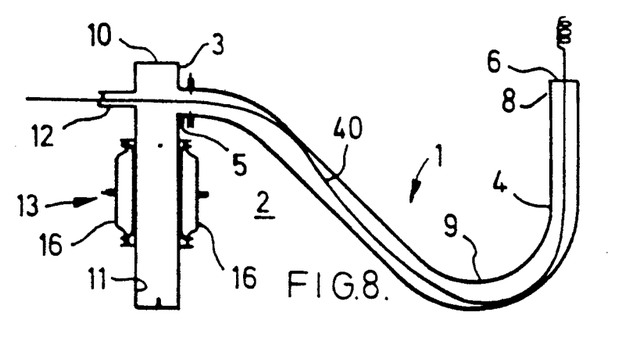

The generator can further be cleaned mechanically, as by rodding, in which case the methane gas supply is again isolated as before and rods such as helical spring steel and polythene sewer rods 40 are fed down the gas supply conduit and out through the inlet 12, exit 5, pipe 4 and opening 6 as shown in FIG. 8. With this cleaning technique, the devices 13 need not be utilised. It will be understood that when the supply of nitrogen to the manifolds is turned off at 19, the natural resilience of the rubber sleeves 15 returns them to their inoperative position (FIGS. 1–4). After cleaning, the methane supply is resumed by suitable operation of the valving 39.

The digester 26 shown in FIG. 14 will not be described in further detail, though it is to be understood that it can be a heating and mixing installation, water being heated by return flow through the riser tubes 35 which have a double wall.

I claim:

1. A gas bubble generator for mixing or promoting turbulence in a liquid medium, comprising:

a hollow gas collector having a gas inlet opening and a gas outlet opening formed in a first portion thereof and a liquid medium ingress-egress opening formed in a second portion thereof and spaced from said first portion, and siphon pipe means leading from said gas outlet opening to a gas-bubble forming outlet of said siphon pipe means, said gas inlet opening being formed in a first sidewall portion of said gas collector and said gas outlet opening being formed in an opposite sidewall portion of said gas collector and in substantial alignment with said gas inlet opening.

2. A gas bubble generator as defined in claim 1, wherein said siphon pipe means includes a siphon pipe having a first portion extending laterally from said gas collector and downwardly from said gas outlet opening, and an upwardly directed second portion leading to said gas-bubble forming outlet and joined to said first portion of said siphon pipe through an intermediate portion in the form of a circular arc greater than 90° and less than 180°.

3. A gas bubble generator for mixing or promoting turbulence in a liquid medium, comprising:
 a hollow gas collector having a gas inlet and a gas outlet formed in a first portion thereof and a liquid ingress-egress opening formed in a second portion thereof and spaced from said first portion,
 siphon pipe means leading from said gas outlet opening to a gas-bubble forming outlet of said siphon pipe means, and
 means for selectively blocking liquid communication between said first portion of said gas collector and the exterior of said gas collector by way of said liquid ingress-egress opening, so as to enable purging of said siphon pipe means by introducing a pressurized fluidic purging medium into said first portion of said gas collector.

4. A gas bubble generator as defined in claim 3, wherein said blocking means comprises means expandable into an interior portion of said gas collector for blocking flow of said liquid medium through said interior portion.

5. A gas bubble generator as defined in claim 4, wherein said expandable means includes an expandable sleeve enclosed by a metal cover and fitted over an opening in a sidewall of said gas collector, said cover having means for passing fluid under pressure into a space between said cover and said sleeve.

6. A gas bubble generator as defined in claim 3, wherein said siphon pipe means includes a siphon pipe having first portion extending laterally from said gas collector and downwardly from said gas outlet opening, and an upwardly directed second portion leading to said gas-bubble forming outlet and joined to said first portion of the siphon pipe through an intermediate portion in the form of a circular arc greater than 90° and less than 180°.

7. A gas bubble generator as defined in claim 3, wherein said gas inlet opening and said gas outlet opening are disposed in substantial alignment in opposite sidewall portions of said gas collector.

8. In a system wherein a liquid containing solid matter is treated with agitation in a treatment vessel:
 gas bubble generator means disposed within said vessel for immersion within the liquid and for generating gas bubbles in the liquid to effect said agitation, said gas bubble generator means including a hollow gas collector having a gas inlet opening and a gas outlet opening formed in a first portion thereof and a liquid ingress-egress opening formed in a second portion thereof and spaced from said first portion, and siphon pipe means leading from said gas outlet opening to a gas-bubble forming outlet of said siphon pipe means, said gas inlet opening and said gas outlet opening being formed in opposite sidewall portions of said gas collector and in substantial alignment with one another, and
 means including a gas supply conduit connected to said gas inlet opening for supplying pressurized gas to said first portion of said gas collector.

9. A system as defined in claim 8, wherein said siphon pipe means includes a siphon pipe having a first portion extending laterally from said gas collector and downwardly from said gas outlet opening, and an upwardly directed second portion leading to said gas-bubble forming outlet and joined to said first portion of the siphon pipe through an intermediate portion in the form of a circular arc greater than 90° and less than 180°.

10. A system as defined in claim 9, wherein said gas bubble generator means is mounted on a floor of said treatment vessel by height-adjustable base means including a first portion supporting said gas collector and a second portion supporting said siphon pipe at said intermediate portion of said siphon pipe.

11. A system as defined in claim 10, wherein said height-adjustable base means comprises a plurality of spaced apart support legs interconnected through support beams, and wherein said support beams are adjustable along the height of said legs by respective captive-screw jack means.

12. A system as defined in claim 11, wherein said floor of said treatment vessel is sloped and each of said legs is supported on said floor by a correspondingly angled foot member.

13. A system as defined in claim 8, wherein said treatment vessel is a sludge digestion tank.

14. In a system wherein a liquid containing solid matter is treated with agitation within a treatment vessel:
 gas bubble generator means disposed within said vessel for immersion in the liquid and for generating gas bubbles in the liquid to effect said agitation, said gas bubble generating means including a hollow gas collector having a gas inlet opening and a gas outlet opening formed in a first portion thereof and a liquid-ingress-egress opening formed in a second portion thereof and spaced from said first portion, and siphon pipe means leading from said gas outlet opening to a gas-bubble forming outlet of said siphon pipe means,
 means including a gas supply conduit connected to said gas inlet opening for supplying pressurized gas to said first portion of said gas collector,
 means for selectively blocking liquid communication between said first portion of said gas collector and said treatment vessel by way of said liquid ingress-egress opening to enable purging of said siphon pipe means by introduction of a pressurized fluidic purging medium into said first portion of said gas collector, and
 means for introducing said purging medium into said first portion of said gas collector.

15. A system as defined in claim 14, wherein said blocking means comprises means expandable into an interior portion of said gas collector for blocking flow of said liquid medium through said interior portion.

16. A system as defined in claim 15, wherein said expandable means includes an expandable sleeve enclosed by a metal cover and fitted over an opening in a sidewall of said gas collector, said cover having means for passing fluid under pressure into a space between said cover and said sleeve.

17. A system as defined in claim 14, wherein said siphon pipe means includes a siphon pipe having a first portion extending laterally from said gas collector and downwardly from said gas outlet opening, and an upwardly directed second portion leading to said gas-bubble forming outlet and joined to said first portion of said siphon pipe through an intermediate portion in the form of a circular arc greater than 90° and less than 180°.

18. A system as defined in claim 17, wherein said gas bubble generator means is mounted on a floor of said treatment vessel by height-adjustable base means including a first portion supporting said gas collector and a second portion supporting said siphon pipe at said intermediate portion of said siphon pipe.

19. A system as defined in claim 18, wherein said height-adjustable base means comprises a plurality of spaced apart support legs interconnected through support beams, and wherein said support beams are adjustable along the height of said legs by respective captive-screw jack means.

20. A system as defined in claim 19, wherein said floor of said treatment vessel is sloped and each of said legs is supported on said floor by a correspondingly angled foot member.

21. A system as defined in claim 14, wherein said purging medium introducing means includes said gas supply conduit.

22. A system as defined in claim 21, wherein said purging medium is a liquid medium, and said purging medium introducing means includes means for selectively feeding said liquid medium to said first portion of said gas collector by way of said gas supply conduit.

23. A system as defined in claim 14, wherein said gas inlet opening and said gas outlet opening are disposed in substantial alignment in opposite sidewall portions of said gas collector.

24. A system as defined in claim 14, wherein said treatment vessel is a sludge digestion tank.

25. A system as defined in claim 24, wherein said purging medium introducing means includes said gas supply conduit.

26. A system as defined in claim 25, wherein said purging medium comprises methane gas from a sludge digestion process in said sludge digestion tank.

27. A system as defined in claim 25, wherein said purging medium is a liquid medium, and said purging medium introducing means includes means for selectively feeding said liquid medium to said first portion of said gas collector by way of said gas supply conduit.

28. A system as defined in claim 27, wherein said purging medium includes effluent from a sludge digestion process in said sludge digestion tank.

* * * * *